United States Patent
Manor (10) Patent No.: US 9,106,277 B2
(45) Date of Patent: Aug. 11, 2015

(54) CAPACITOR POWERED MOBILE ELECTRONIC DEVICE

(76) Inventor: Dror Manor, Herzlia (IL)

(*) Notice: Subject to any disclaimer, the term of this patent is extended or adjusted under 35 U.S.C. 154(b) by 492 days.

(21) Appl. No.: 13/129,685

(22) PCT Filed: Nov. 17, 2009

(86) PCT No.: PCT/IL2009/001084
§ 371 (c)(1),
(2), (4) Date: Jun. 16, 2011

(87) PCT Pub. No.: WO2010/055523
PCT Pub. Date: May 20, 2010

(65) Prior Publication Data
US 2011/0244929 A1    Oct. 6, 2011

Related U.S. Application Data

(60) Provisional application No. 61/193,323, filed on Nov. 17, 2008.

(51) Int. Cl.
*G05F 1/445*    (2006.01)
*H04B 1/04*    (2006.01)

(52) U.S. Cl.
CPC ..................................... *H04B 1/04* (2013.01)

(58) Field of Classification Search
CPC ....... G05F 1/445; G05D 23/241; H05B 39/08
USPC .......... 323/128, 242, 906; 320/128; 455/572; 429/7
See application file for complete search history.

(56) References Cited

U.S. PATENT DOCUMENTS 5,481,178 A * 1/1996 Wilcox et al. ................. 323/287
7,183,014 B2 * 2/2007 Sasaki et al. ..................... 429/7

* cited by examiner

*Primary Examiner* — Adolf Berhane
*Assistant Examiner* — Yemane Mehari
(74) *Attorney, Agent, or Firm* — Neal, Gerber & Eisenberg LLP (57) ABSTRACT

A battery driven mobile communication device drawing a base current with periodic high current pulses during transmission. The current pulses may be larger than the current level which the device's battery can supply. The device uses a switched mode power supply with an output capacitor sufficiently large to provide the high current pulses when demanded by the load, without its voltage falling below that necessary to operate the device. This power supply provides the average current drawn by the load, and maintains the capacitor's charge. When the load demands a current pulse, that excess current is drawn from the capacitor, which begins to discharge. Once each pulse is completed, the battery continues to provide the lower baseline current of the device, and at the same time tops up the capacitor to replace the charge used during the pulse. The battery may be a low cost primary battery.

21 Claims, 3 Drawing Sheets

CAPACITOR POWERED MOBILE ELECTRONIC DEVICE

This is a 35 U.S.C. §371 application of PCT/IL2009/001084, filed Nov. 17, 2009, and claims the benefit under 35 U.S.C. §120 of said PCT application, and further claims the benefit under 35 U.S.C. §119(e) of U.S. Provisional Patent Application Ser. No. 61/193,323, filed Nov. 17, 2008. The contents of this priority application are incorporated herein by reference.

FIELD OF THE INVENTION

The present invention relates to the field of the powering sources for portable electronic equipment, and especially of batteries for use in mobile telephones.

BACKGROUND OF THE INVENTION

Portable electronic equipment is generally powered by secondary batteries to enable the power source to be regenerated when depleted. In some cases, the current drain required from the battery by the portable equipment may be substantial for short periods, such as for portable cellular phones during transmission. Although the average power supplied by the battery is moderate, substantial pulses of current may be required for short periods during transmission. It is for this reason that the batteries used in such devices have to have low internal resistance, such that they are capable of supplying these high current pulses. Generally, batteries such as Li-ion are used in such applications, as they can supply the high current pulses. Most primary cells, even though they may have higher storage capacity, cannot be used to power such devices. Since batteries such as Li-ion with high current supplying capabilities are generally expensive, this may be a limitation on the proliferation of the use of such devices. Thus, if a cheaper method of supplying power were available for cellular phones, it has been estimated that there would be much wider use of such devices, especially in developing parts of the world. Such a power source should be able to use standard primary cells such as alkaline cells that are low-cost, simple, safe and very widely available, these features being in contrast to the Li-Ion phone batteries generally used today. Furthermore, such a power source would enable the proliferation of such devices in regions without a developed electricity infrastructure.

The disclosures of each of the publications mentioned in this section and in other sections of the specification are hereby incorporated by reference, each in its entirety.

SUMMARY OF THE INVENTION

The present disclosure describes a new type of power supply for use with portable electronic devices, especially mobile communication devices such as cellular phones, which enable the device to operate using readily available, low cost, batteries, even though these batteries are unable to directly supply the peak current levels demanded by the device. The batteries may be primary or secondary, although the full extent of the cost saving possible using such power supplies will be apparent only when using primary cells. Furthermore, in a cellular phone designed specifically for use with a primary battery and a power supply of the type described in the present disclosure, there will be no need for the charging and protection circuits in the phone, nor for a wall charger and charging connector. Consequently, the savings in production cost go beyond the simple saving resulting from the elimination of the need for a Li-ion battery. Although the power supplies described herewithin can be used for any electronic devices, they will be described in this disclosure in terms of their use in cellular phone devices, this being a typical and widely used device which is able to benefit by use of the power supplies described. It is to be understood though, that the claimed invention is not meant to be limited to such cellular phone use, but is usable for any other mobile electronic device having high pulsed current requirements.

The exemplary power supplies described in the present disclosure utilize a capacitor on their output side, which can provide high current pulses when demanded by the load. The capacitor output may advantageously be fed by a switched mode power supply, such as a pulse width modulation (PWM) power module, which provides the average current drawn by the load, and maintains the charge on the capacitor. When the load demands a high current pulse, larger than the peak current which the battery and hence the PWM power module can supply, that excess current is drawn by the load from the capacitor, which begins to discharge. The rate of discharge is determined by the capacity of the capacitor relative to the current drawn, and the capacity is selected such that under the most severe pulsed current requirements of the device, the voltage on the capacitor will not fall by more than a predetermined amount which will ensure that the device continues to function normally. Once the need for the current pulse is over, the battery continues to provide the lower baseline current of the mobile device, and at the same time tops up the capacitor to replace the charge used by the device. The capacitor charging parameters should optimally be such that the capacitor is fully charged by the time another high current pulse is required, though this is not a mandatory requirement, so long as the state of charge of the capacitor is such that it can continue to supply the pulse current demands of the device. During phone transmission, current pulses occurs at closely spaced intervals; when not transmitting, there will generally be no high current pulses, and the battery and PWM module supply all of the current needs of the load without drawing from the stored energy in the capacitor. In order to clarify the nomenclature used in this disclosure, it should be noted that the term current pulse is understood to mean the total value of current drawn during the pulse, i.e. measured from zero, and not just the additional current added to the base level current extant between pulses.

The overall combination of a source battery, a controlled PWM power unit and a large capacitor at its output are features which enable the construction of a cellular phone (or other portable electronic device with similar characteristics), operable without incorporating a high current rating battery, which is a comparatively costly component of such a phone. Such a phone comprises all three of these elements as its power supply, such that it can operate with a simple low cost battery as its only power source, with the current pulses required being supplied by the capacitor.

According to the presently described system, the power source has to provide the average current demand of the load in a continuous manner, and in addition, its output capacitor has to be arranged to discharge in a manner which fulfils two conditions:

(i) it discharges at a rate no faster than that required to power the load, and predetermined to maintain the capacitor voltage at a level capable of continuing to operate the load, and (ii) it performs this discharge while maintaining that voltage for at least the length of time during which the load needs to draw current from the capacitor to supply the pulse needs at a level which the battery and the power supply alone could not supply.

However, in addition to the current pulses drawn from the power supply by the phone circuitry load, there is also a DC current consumption demanded by the load for powering other parts of the load circuitry not directly related to the pulses generated during transmission. Furthermore, since the magnitude and the repetition rate of the current pulses vary with the level of transmission required, one or both being higher when the quality of the transmission link is poor, such as to a distant antenna or from a sheltered location, and one or both also being higher when transmission conditions are crowded, or when the transmission content is dense, the average current to be delivered to the capacitor for supplying the current pulses will also vary with transmission conditions. Therefore, the inability of a primary battery to deliver the high current pulses required by a mobile phone is only one aspect in which such a battery may be unsuitable for mobile phone use without the use of a capacitor output circuit such as that described herewithin.

Another aspect of the suitability of the use of standard low-cost batteries for powering mobile phones is the requirement of the supply battery to provide its current efficiently, in order to be able to utilize as much of its stored energy as possible. This involves reducing the overall current drawn from the battery as much as possible, since the average current drawn from a primary cell has an important effect on the total energy that the battery can deliver. This is reflected firstly by the need to optimize the current drawn from the battery in accordance with the level of pulses to be drawn from the capacitor by the load circuits. As the pulse rate goes down and as the pulse height goes down, the average current drawn from the battery can be reduced, yet will still keep the capacitor charged to the required voltage for maintaining pulses of sufficient height to ensure correct transmission, in addition to supplying the background DC current for the load circuits. Likewise, as the average background DC current used by the load circuit goes down, the total average current consumption from the battery can be kept as low as possible, while still maintaining the required average DC current, and supplying the charging current to the capacitor to enable it to continue supplying the required pulses.

The effect of current drain on the energy efficiency of a battery is significant. Thus for instance, when operated close to it maximum rated current, an alkaline battery may be able to deliver only 20% of its energy as useful current to the load, the remaining 80% being dissipated as heat. With efficient management of the current drain, this 20% figure can be more than doubled. The power supplies described in the present disclosure may therefore include in the control element, a current control algorithm to manage the current drawn from the battery in an efficient way, in accordance with the pulse requirement and the average background DC requirement. This is also useful in extending the life of and usefulness of a partly depleted or weak battery. By limiting the current output to the minimum level necessary for maintaining the capacitor charged, the system is able to continue to function for a longer period than a battery of similar status without this current limitation. Thus, an increase in pulse to pulse spacing should generate a lower battery drainage current, since the longer time interval between pulses enables the battery to fill up the charge drawn from the battery at a lower current charging rate. Conversely, such a current conserving control enables a weak or depleted battery to power the phone for a longer time than a phone without such a control function, since the control algorithm will limit the charging current drawn from the battery to that required for the transmission conditions encountered. The full recharge current would only be drawn at the highest power transmission encountered.

One exemplary implementation of the devices described in this application involves a mobile communication device comprising:
(i) a DC/DC converter, receiving current from a battery at a first voltage and outputting current for powering the device at a second voltage, higher than the first voltage,
(ii) device circuitry powered by the current at the second voltage, the device circuitry being capable of drawing a base current together with pulses of current greater than the base current, the current pulses having a magnitude generally larger than the current which the battery can provide,
(iii) a control system utilizing at least the second voltage to determine the current to be output by the DC/DC converter, and
(iv) a capacitor at the output of the DC/DC converter, the capacitor having such a value that it can supply the current pulses to the device circuitry without the voltage on the capacitor falling below a predetermined threshold.

The control system in such a mobile communication device may also advantageously utilize the first voltage to determine the current to be output by the DC/DC converter.

Such a mobile communication device may further comprise a battery cavity into which the battery is removably installed. Alternatively, the battery may be wired into the device.

In such a mobile communication device, the current pulses may be periodic pulses, generated when the device is transmitting. Furthermore, the control system may ensure that the current delivered by the DC/DC converter is such that use of the stored energy of the battery is optimized by limiting the current drawn from the battery. This can be achieved if the control system adjusts the power drawn from the battery according to the average power required by the current pulses. The device may further comprise a circuit for entering a sleep mode when the current required by the device falls below a predetermined level.

Additional implementations described in this disclosure may involve a power supply for a mobile communication device which draws during its operation, a current comprising a base current together with pulses of current greater than the base current, the power supply comprising:
(i) a DC/DC converter, receiving current from a battery at a first voltage and outputting current to the mobile communication device at a second voltage higher than the first voltage,
(ii) a controller which utilizes at least the second voltage to determine the current to be output from the converter, and
(iii) a capacitor at the output of the converter, the capacitor having such a value that it can supply the current to the mobile communication device without the voltage on the capacitor falling below a predetermined threshold,
wherein the pulses of current drawn by the mobile communication device have a magnitude generally larger than the current which the battery can provide.

The control system in such a power supply may also advantageously utilize the first voltage to determine the current to be output by the DC/DC converter.

The power supply may be such that the battery, the DC/DC converter and the capacitor are incorporated into a battery pack of size and form such that it can be used to replace a rechargeable battery generally used to power the mobile communication device.

Such a power supply may further comprise a battery cavity into which the battery is removably installed. Alternatively, the battery may be wired into the device.

In such a power supply, the current pulses may be periodic pulses, generated when the device is transmitting. Furthermore, the control system may ensure that the current delivered by the DC/DC converter is such that use of the stored energy of the battery is optimized by limiting the current drawn from the battery. This can be achieved if the control system adjusts the power drawn from the battery according to the average power required by the current pulses. The power supply may further comprise a circuit for entering a sleep mode when the current required by the device falls below a predetermined level.

In any of the above exemplary implementations, the mobile communication device may be a cellular phone, and the battery may be a primary battery. Additionally, the battery may be any one of an alkaline battery, a carbon-zinc battery a nickel cadmium battery and a nickel metal hydride battery.

BRIEF DESCRIPTION OF THE DRAWINGS

The presently claimed invention will be understood and appreciated more fully from the following detailed description, taken in conjunction with the drawings in which:

DETAILED DESCRIPTION

Figure 1:
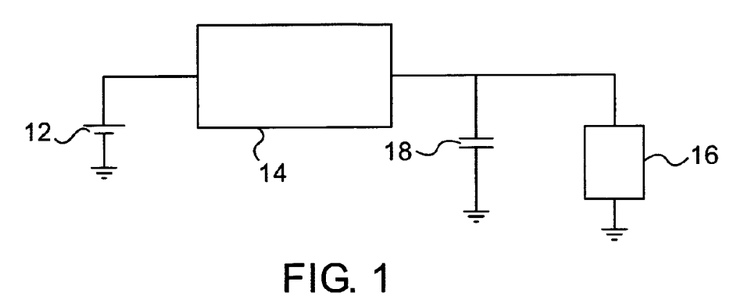
FIG. 1 illustrates schematically an implementation of the basic features of a power supply of the present application, used for powering a cellular phone.

Reference is now made to FIG. 1, which illustrates schematically a block diagram of an implementation of the power supplies of the present application, used in this example for powering a cellular phone 16. The power source for the phone is a battery 12, which can be any type of battery capable of supplying the average power required by the phone. The operating advantages of the power supply of this disclosure will be most effectively felt if a low cost primary battery is used, such as an alkaline battery, though the power supply will operate with any type of battery, primary or secondary, and having high level specifications or a simple low cost type. It is to be understood that the term battery, even though technically meaning a battery of cells, is used herewithin and is also so claimed, to also refer to a single electrochemical cell, as in its popular usage. The battery 12 could thus be understood to be a single cell or more than one cell. The battery 12 inputs current to a power supply module, shown in this example as a pulse width modulated (PWM) power supply 14. The PWM unit supplies current to the load, in this example a cellular phone 16, and operates as a controlled DC/DC up-converter, to convert the generally low voltage battery output to the higher voltage required by the phone. The battery source may typically provide a voltage of from 1.2 to 1.5 V, depending on the type of battery, while the phone may require its power input at a voltage of from 3.2 to 4.5 V. The PWM unit has a large capacitor 18 at its output, which could be of the order of 2,200 or even 3,300 µF. A 2,200 µF aluminum capacitor has a size of only approximately 10 mm. diameter×20 mm high, for such a low rated voltage (6.3V), such that it will comfortably fit into a cellular phone of dimensions currently in use. The operational details of the power supply will be described hereinbelow.

Figure 2:
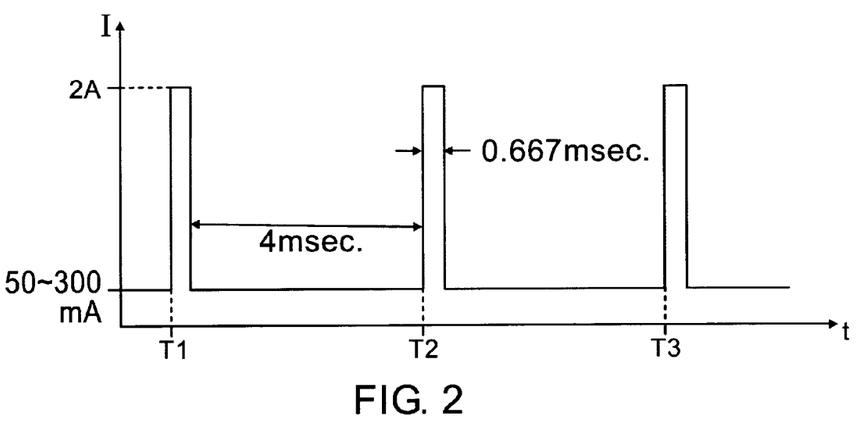
FIG. 2 shows a graph of the form of the current drawn by a cellular phone while in the transmission mode.

Reference is now made to FIG. 2, which shows a typical graph of the form of the current drawn by a cellular phone while in the transmitting mode. The form is generally of a low level base current, with periodic narrow peaks of much higher current. Since the actual currents drawn will be dependent on the type of phone, its built-in accessories, the distance from the cellular antenna, and other factors, the numbers given for the current parameters on the graph are to be considered as being only an illustrative example of the form. The base current level may be of the order of 50 mA and the average current drawn may be between 50 and 300 mA, though telephones with many features may require a higher average consumption than this. For a typical GSM standard transmission, there are narrow pulses of significantly higher current than the base current level, typically of up to 2 A, every 4 msec., at times T1, T2, T3, . . . . The pulse widths are only 0.667 msec, such that at this low mark-to-space ratio, 16%, the average power of the transmission is also comparatively low. Consequently, although the battery 12 is incapable of supplying the 2 A peaks of current, it is well able to supply the average current in the range of approximately tens to a few hundred milliamps.

Furthermore, the pulse spacing, and the pulse height are both functions of the transmission conditions, as mentioned hereinabove in the Summary section of this disclosure. In current cellular phone networks, the transmitted power, and hence the pulse configuration, can vary between approximately 60 mW to 600 mW, depending on these conditions. The pulse spacing can increase in multiples of 4 msec, according to the reduction in transmitted power.

Figure 3:
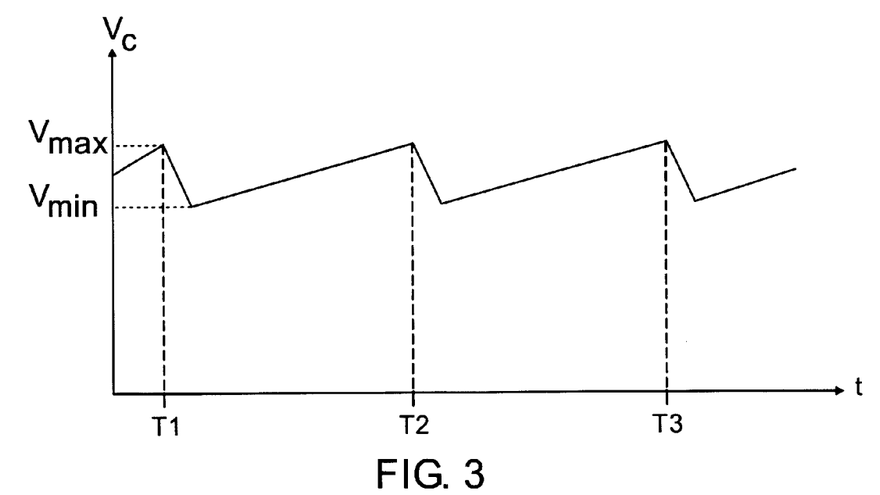
FIG. 3 shows a graph of the voltage on the power supply output capacitor while the cellular phone is in its transmission mode.

Reference is now made to FIG. 3, which is a graph of the voltage $V_c$ on the capacitor 18 while the load 16 is operating in a high current consumption mode, i.e. while the phone is transmitting. The time scale of FIG. 3 is the same as that of FIG. 2. At times T1, T2, T3, . . . when the load begins drawing the high current pulses from the capacitor, Vc commences a steep drop, from its maximum value $V_{max}$, which is generally the output voltage of the PWM supply, to its minimum value $V_{min}$. As soon as the pulse is over, the PWM module 14 begins charging up the capacitor to replenish the charge taken by the current pulse in the load, until the maximum voltage $V_{max}$ is again reached. (Although the curves are shown as sections of straight lines in FIG. 3, the current in fact falls and rises exponentially.) The comparative levels of $V_{max}$ and $V_{min}$ are determined by a combination of a number of factors:

(i) the output characteristics of the PWM power supply 14, both in terms of the maximum output voltage delivered, and by the current rating of the supply;
(ii) the current supplying ability of the battery 12;
(iii) the characteristics of the load pulses and the average current drawn by the load; and
(iv) the value of the capacitor.

These parameters are chosen so that $V_{min}$ is at least the minimum voltage required by the load to function correctly, commensurate with the size of the current pulses drawn by the load.

The value of the capacitor required is dependent on the size and duration of the current pulses to be supplied by the capacitor, and on the fall in the phone circuitry operating voltage that can be tolerated during the duration of the pulses, without affecting the operation of the phone. Assuming that the battery 12 is just able to supply the base current and no more, and that all of the current for the pulses is supplied by discharge of the capacitor, the value of the capacitor C can be calculated by equating the change in the level of energy stored on the capacitor, with the energy expended during the duration of a pulse, since it is known that the energy released from the capacitor during its discharge stages, goes into supplying the energy for the pulses. Assuming a square wave pulse, this can be expressed mathematically as:

$$C(V_{max}^2 - V_{min}^2)/2 = I[(V_{max} + V_{min})/2]\Delta t \qquad (1)$$

where I is the pulse current, lasting for a period $\Delta t$.

The overall combination of a source battery 12, a controlled PWM power unit 14 and a large capacitor 18 at its output are features which enable the construction of a cellular phone (or other portable electronic device with similar characteristics), which can operate without a high current rating battery. These three elements constitute the power supply of the phone, such that it can operate with a simple low cost battery as its only power source, with the current pulses required being supplied by the capacitor.

In addition to the basic circuit elements described in FIG. 1, in order to operate correctly, power supplies of the present application may also have a number of control features, as will now be described in FIGS. 4 and 5.

Figure 4:
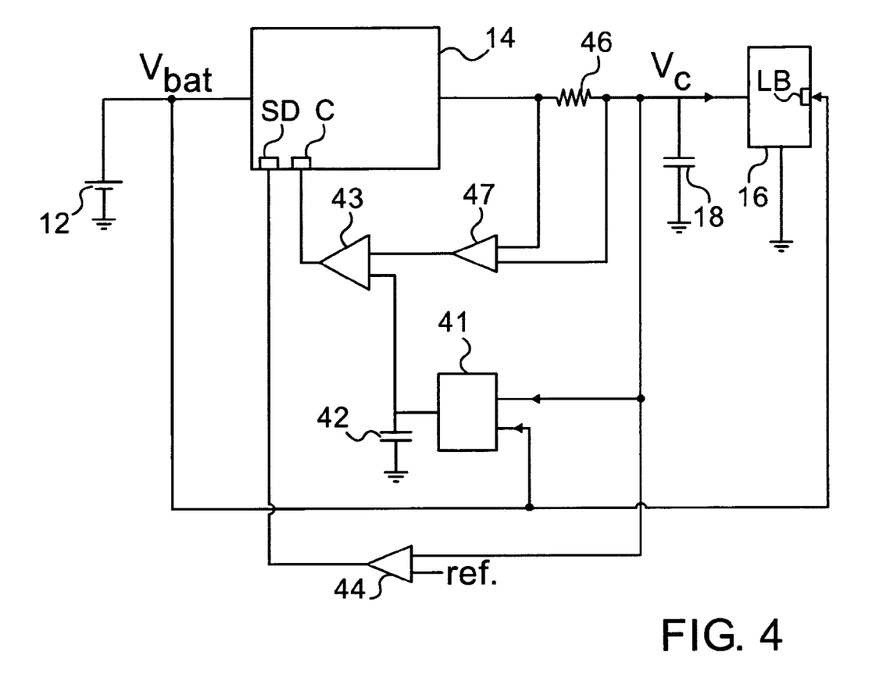
FIG. 4 is a schematic circuit diagram of a cellular phone incorporating a power supply of the type shown in FIG. 1, including a number of control functions.

Reference is now made to FIG. 4 which is a schematic circuit diagram of a cellular phone application incorporating a power supply of the type shown in FIG. 1, and including a number of control functions necessary for the correct operation of the power supply.

The current control of the PWM output is effected by means of a signal input applied at the control pin marked C. This signal input is generated by a control current element 41. This control element provides an output signal defining the current to be supplied by the PWM unit as a function of two parameters:

(a) the output voltage, $V_c$, as measured on the capacitor 18, and
(b) the battery voltage $V_{bat}$.

In order to decrease the effect of the current pulses on the output voltage of the control current element 41, a capacitor 42, typically of the order of 1 µF, is used to average out the effect of the large variations in $V_c$.

Figure 5:
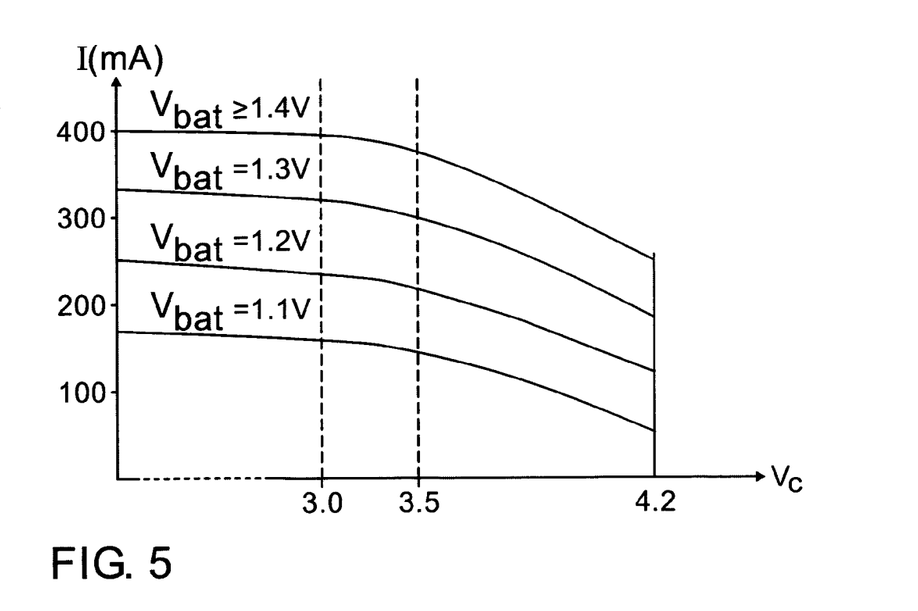
FIG. 5 shows graphs illustrating the current/voltage characteristics used in controlling the output current of the PWM supply of the phone of FIG. 4.

The current required is predefined by a set of characteristic curves, an example of which is shown in FIG. 5, which shows a graph illustrating the current/voltage characteristic used in controlling the output current of the PWM supply, for various values of the battery voltage $V_{bat}$. For a given battery state, as reflected by the battery terminal voltage, $V_{bat}$, the lower the value of $V_c$, the higher the current required from the PWM unit to replenish the capacitor and to power the load. Conversely, the lower the battery terminal voltage, the less current the battery is able to deliver to the load. Consequently, these characteristic curves provide the correct-balance between the load requirements for a particular battery state, and the battery's ability to supply that current, depending on its output terminal voltage.

Alternative control algorithms may be used on condition that the stability of the control loop is maintained. According to yet another exemplary control function, the output current characteristic curve may be independent of the battery voltage, such that it is only dependent on the capacitor voltage.

In any event, according to any of these possible control functions, the drop in capacitor voltage will generally be interpreted as resulting from the withdrawal of charge from the capacitor by a current pulse in the device, and the consequent need to top up the capacitor charge from the converter output current. The larger the fall in the capacitor voltage, the greater the need for output current from the DC/DC converter for this replenishing operation.

In the example characteristics shown in FIG. 5, for the example of a battery having a full charge, and hence a $V_{bat}$ of 1.4 V or more, when the output voltage is anywhere below a value of approximately 3.5 V, indicating that the combination of the DC background current with pulses of either or both high current intensity or closely spaced, is causing the capacitor voltage to drop significantly during pulses, the power supply control signal input at C is such that the maximum current is output, shown in this case as 400 mA. As the voltage rises above 3.5 V, indicating both that, as a result of the reduction in transmitted power, any charge deficiency in the capacitor is being filled, and that the averaged current drawn by the load is being fulfilled by the power supply, the current output from the PWM power supply is gradually reduced. As $V_c$ approaches 4.2V, indicating an essentially full capacitor, coupled with an averaged current drain by the phone which the power supply can fulfill, the output current in the example shown is continually reduced until the voltage reaches 4.2 V. Above this voltage, the power supply is closed down in a sleep state, as the current required by the phone load is minimal. This set of characteristics may be stored in the control element 41, such that the current control output signal generated from the control element depends on the current need, and on the battery's ability to supply that current. For a lower $V_{bat}$, indicating a battery in a lower state of charge, the characteristic curve is typically lower, but also ends at 4.2V, above which no further current is demanded from the power supply.

The current control algorithm thus ensures that the current is drawn from the battery in a manner that ensures efficient utilization of the stored energy in the battery from two aspects:

(i) use of a sleep mode for the PWM DC/DC converter when minimal withdrawal of current from the capacitor is detected, and
(ii) limiting of the current level drawn from the battery by use of the storage capacitor, it being known that generally the lower the current discharge from a battery, the higher the energy storage efficiency of the battery.

A convenient way of generating the control signal for the PWM power supply is by sensing the actual current output supplied, which can be performed using a current sensing resistor 46 and sense current amplifier 47, and by comparing in an error amplifier 43, a signal derived therefrom with the signal generated by the current control element 41, which indicates the desired level of current according to the predetermined characteristics. Any difference between the actual sensed current and the current dictated by the predetermined I/V characteristics is output from the error amplifier 43 as an error signal. This error signal is input to the control pin C, of the PWM to adjust the output current accordingly until it matches the current dictated by the output voltage, reducing the error signal to zero. The system thus becomes self regulating, in that if the phone for instance, requires less average current, the output voltage will rise, and the error loop will ensure that the PWM power supply outputs less current in accordance with the current indicated by the new position on the I/V characteristic curve. Similarly, if the average current demand rises, the output voltage $V_c$ will fall, driving the control to raise the output current until it matches that indicated by the particular I/V characteristic.

When the current demand by the phone falls to a very low level, indicating that the phone is in a standby condition, with a current consumption of perhaps the order of 2 mA or so, the output voltage will have risen to 4.2 V, and the power supply will be in the cut-off state, without supplying any current. As the current slowly drains from the capacitor, the voltage will fall, and as soon as it reaches the hysteresis turn on point of the I/V characteristic, which may be of the order of 4.1 V, the power supply will switch on again for a short time in order to top up the capacitor to the 4.2 V level. Thus, when there is negligible current consumption by the phone, the power supply goes into a sleep mode, with occasional current bursts to compensate for current leakage from the capacitor. The power supply thus behaves with the high efficiency commensurate with WPM supplies while it is delivering normal loads, while going into a sleep mode with very low current consumption when the phone is not operating.

Since the WPM unit, while operating, cannot reduce the current it supplies to zero, some additional control is required in order to enter the burst operational mode. This is achieved by means of the burst control loop, with its amplifier 44, which applies a signal to the Shut Down pin SD of the PWM module if the output voltage exceeds a predetermined level, signifying minimal current drawn by the load, as is found in the sleep mode.

The $V_{bat}$ input signal to the current control element 41 is effective in limiting the use of the phone when the battery is in a state of partial discharge. When the battery is in such a poor state of discharge such that it cannot properly generate a useful transmission, a "Low Battery" signal should be provided and the PWM shut down. The PWM can be shut down by a control output from the control element 41 when the battery voltage falls below a predetermined level. This element can also be used also to turn on a "Low Battery" warning lamp LB on the phone, by means of a control element within the phone, so that the user knows the reason for the shutdown, and can replace the battery accordingly.

Figure 6:
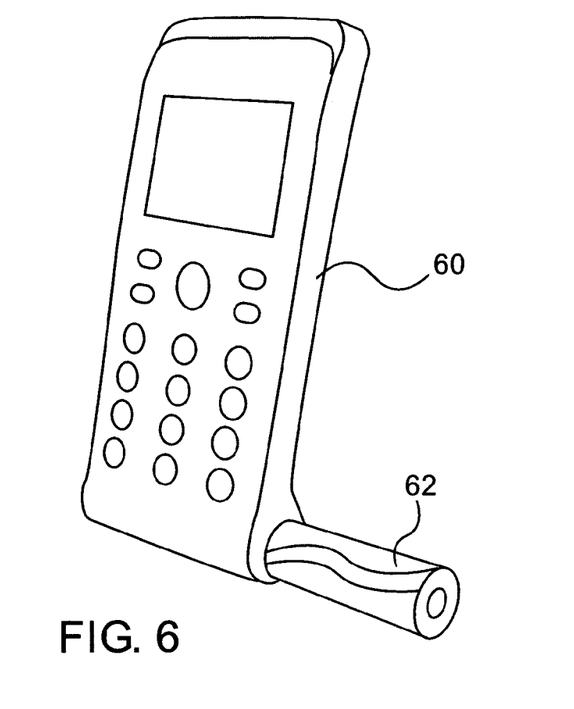
FIG. 6 is an illustration of a stand alone capacitor powered phone, powered by an AA battery inserted into an internal battery cavity.

Some of the possible ways in which the novel capacitor output power supply described above can be implemented in a cellular phone, or any other similar device will now be suggested. One exemplary way is to build the entire battery cavity, power supply with capacitor and phone circuitry into a single package, which resembles a conventional cellular phone, an example of which is illustrated in FIG. 6. The phone 60 then becomes a stand alone device, which is powered by a battery 62 inserted into an internal battery cavity adapted to receive an AA battery, or any other type for which the phone is designed to operate with. As emphasized above, the battery can be of the simplest and least costly type, so long as it can supply the averaged current demanded by the phone.

Figure 7:
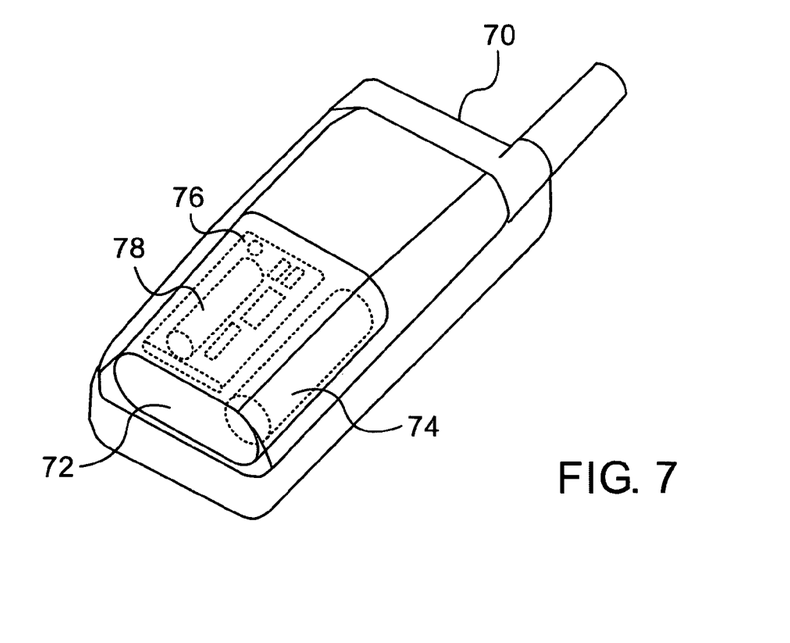
FIG. 7 is an illustration of a phone having a capacitor power supply according to FIG. 4, installed in a package which fits into the battery compartment of a conventional cellular phone to convert it to a capacitor powered phone.

An alternative example of the use of the power supply of the present disclosure could be to incorporate the battery, the PWM power supply unit, the capacitor, and any of the control circuits used, into a separate enclosure module or package, which plugs into a cellular phone, providing all of the advantages of the capacitor based power supply. This module or package could advantageously constructed to be the same size as the regular Li-ion battery of the phone, such that this package can be fitted into the regular battery compartment to convert a regular phone to a capacitor powered phone. An example of such a phone conversion is shown in FIG. 7. The phone 70 has the usual enclosure on its back side, into which its rechargeable Li-ion battery is usually fitted. The replacement pack 72 in this example contains an AA battery 74, which may be replaced when depleted, a circuit board 76 incorporating the PWM power supply and any control circuits associated therewith, and the storage capacitor 78. The contacts of this pack are designed to be compatible with the matching contacts in the phone body, such that the pack is a direct plug-in replacement for the regular phone rechargeable battery, with the advantage of the use of low cost batteries.

The cellular phone could alternatively be a dedicated type, constructed without a battery compartment at all, for use with the capacitor output power supply enclosure module described above, or it could be a regular cellular phone, with an additional input port so that it can be powered by the capacitor output power supply enclosure module instead of by the regular rechargeable battery, or when the regular rechargeable battery is depleted.

As a further alternative, the battery could be a rechargeable battery, such as a NiMH battery, which could then be permanently wired into the phone, and recharged externally when necessary. Replacement of the battery is not then intended to be a user performed action. Additionally, any of the implementations using a rechargeable battery could also be provided with a solar recharging unit, such that the phone can operate completely independently of a mains power supply.

It is to be understood that this disclosure is applicable to novel capacitor output power supplies regardless of how the battery power is delivered to that circuit or phone, and that references and claims to a battery cavity or a battery holder or the like are intended to include any manner of connecting the battery to power the circuit.

Example

An example of the phone performance obtainable with a capacitor based power supply, constructed according to the present disclosure, is shown in Table I below. The results were obtained on a converted Nokia 1200 phone, using a single AA battery either of an alkaline type (Energizer EN91), or of a rechargeable NiMH type (Energizer NH15), and an NH1-GEN1A-A power conversion chip, obtainable from Techtium Ltd., of Tel Aviv, Israel. The full load was simulated as a transmission using 2.2 A current pulses of duration 0.6 msec. every 4 msec.

TABLE I

| AA Battery Type | Test Conditions | Time |
| --- | --- | --- |
| Alkaline | Full load at output | Max. Talk Time - 53 min |
| Alkaline | Average load at output | Avg. Talk Time - 4 hours |
| Alkaline | Standby | 275 hours |
| NiMH | Full load at output | Max. Talk time - 109 min |
| NiMH | Average load at output | Avg. Talk Time - 5.5 hours |
| NiMH | Standby | 275 hours |

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

I claim:

1. A mobile communication device having a capacitor based power source comprising:
   device circuitry being capable of drawing a base current together with pulses of current greater than the base current;
   a power supply powering the device circuitry, the power supply having a source battery, a controlled pulse width modulated (PWM) power unit and a capacitor at the output of the PWM power unit, the source battery providing a low voltage base current to the device circuitry and low voltage pulse current to the PWM power unit, the PWM power unit converting the low voltage pulse current up to a higher pulse voltage current and providing the higher voltage pulse current to the capacitor, the capacitor having a maximum voltage value and a predetermined voltage threshold which is lower than the maximum voltage value, the maximum voltage value is approximately the same voltage value as the higher voltage pulse current output by the PWM power unit, the capacitor capable of supplying pulses of pulse current to the device circuitry without the capacitor voltage falling below the predetermined voltage threshold; and a control system utilizing at least the voltage value of the pulses of current being supplied by the capacitor to the device circuitry to determine the amount of higher voltage pulse current to be output by the PWM power unit to the capacitor, wherein when the load on the device circuitry begins drawing pulses of current from the capacitor, the voltage value on the capacitor drops from the maximum value to the predetermined threshold, and when the draw of the pulses of current end, the PWM power unit outputs higher voltage pulse current to replenish the capacitor to the maximum value.

2. A mobile communication device according to claim 1, wherein the control system further utilizes low voltage pulse current to determine the current to be output by the PWM power unit.

3. A mobile communication device according to claim 1 wherein the source battery is permanently wired into the mobile communication device.

4. A mobile communication device according to claim 1 wherein the pulses of current are periodic pulses, generated when the mobile communication device is transmitting.

5. A mobile communication device according to 1 wherein the control system ensures that the current delivered by the PWM power unit is such that use of the stored energy of the source battery is optimized by limiting the current drawn from the source battery.

6. A mobile communication device according to claim 1, further comprising a circuit for entering a sleep mode when the current required by the mobile communication device falls below a predetermined level.

7. A mobile communication device according to claim 1, wherein the control system adjusts the power drawn from the source battery according to the average power required by the pulses of current.

8. A mobile communication device according to claim 1, wherein the mobile communication device is a cellular phone.

9. A mobile communication device according to claim 1, wherein the source battery is a primary battery.

10. A mobile communication device according to claim 1, wherein the source battery is any one of an alkaline battery, a carbon-zinc battery, a nickel cadmium battery and a nickel metal hydride battery.

11. A mobile communication device according to claim 1, wherein the control system configured to reduce the higher voltage pulse current output by the PWM power unit to zero when there is no load requirement on the capacitor and when the voltage value on the capacitor reaches a maximum value.

12. A power supply for a mobile communication device which draws during its operation, a current comprising a base current together with pulses of current greater than said base current, said power supply comprising:

a source battery, a controlled pulse width modulated (PWM) power unit and a capacitor at the output of the PWM power unit, the source battery providing a low voltage base current to the device circuitry and low voltage pulse current to the PWM power unit, the PWM power unit converting the low voltage pulse current up to a higher pulse voltage current and providing the higher voltage pulse current to the capacitor, the capacitor having a maximum voltage value and a predetermined voltage threshold which is lower than the maximum voltage value, the maximum voltage value is approximately the same voltage value as the higher voltage pulse current output by the PWM power unit, the capacitor capable of supplying pulses of pulse current to the device circuitry without the capacitor voltage falling below the predetermined voltage threshold; and a control system utilizing at least the voltage value of the pulses of current being supplied by the capacitor to the device circuitry to determine the amount of higher voltage pulse current to be output by the PWM power unit to the capacitor, wherein when the load on the device circuitry begins drawing pulses of current from the capacitor, the voltage value on the capacitor drops from the maximum value to the predetermined threshold, and when the draw of the pulses of current end, the PWM power unit outputs higher voltage pulse current to replenish the capacitor to the maximum value.

13. A power supply according to claim 12, wherein the control system further utilizes the low voltage pulse current to determine the current to be output by the PWM power unit.

14. A power supply according to claim 12, wherein the source battery, the PWM power unit and the capacitor are incorporated into a battery pack of size and form such that it can be used to replace a rechargeable battery generally used to power the mobile communication device.

15. A power supply according to claim 12, further comprising a battery cavity into which the battery is removably installed.

16. A power supply according to claim 12, wherein the battery is permanently wired into the mobile communication device.

17. A power supply according to claim 12, wherein the pulses of current are periodic pulses, generated when the mobile communication device is transmitting.

18. A power supply according to claim 12, wherein the control system ensures that the current delivered by the PWM power unit is such that use of the stored energy of the source battery is optimized by limiting the current drawn from the source battery.

19. A power supply according to claim 12, further comprising a circuit for entering a sleep mode when the current required by the mobile communication device falls below a predetermined level.

20. A power supply according to claim 12, wherein the control system adjusts the power drawn from the source battery according to the average power required by the pulses of current.

21. A mobile communication device according to claim 12, wherein the control system configured to reduce the higher voltage pulse current output by the PWM power unit to zero when there is no load requirement on the capacitor and when the voltage value on the capacitor reaches a maximum value.

* * * * *